(12) United States Patent
Ohe

(10) Patent No.: US 7,043,163 B2
(45) Date of Patent: May 9, 2006

(54) OPTICAL TRANSMISSION DEVICE

(75) Inventor: Nobuyuki Ohe, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 611 days.

(21) Appl. No.: 10/194,622

(22) Filed: Jul. 11, 2002

(65) Prior Publication Data

US 2003/0011848 A1    Jan. 16, 2003

(30) Foreign Application Priority Data

Jul. 12, 2001    (JP)    ............... 2001-212397

(51) Int. Cl.
*H04B 10/12*    (2006.01)

(52) U.S. Cl. .................................... 398/141
(58) Field of Classification Search ............ 385/19–34; 398/141; 359/127
See application file for complete search history.

(56) References Cited

U.S. PATENT DOCUMENTS 6,454,467 B1 *    9/2002    Ishihara et al. ............... 385/88

FOREIGN PATENT DOCUMENTS

| JP | 08-008818 | 1/1996 |
|----|-----------|--------|
| JP | 11-119061 | 4/1999 |
| JP | 11-345987 | 12/1999 |
| JP | 2000-347074 | 12/2000 |
| WO | WO 00/73833 A1 | 12/2000 |

* cited by examiner

*Primary Examiner*—David C. Payne
(74) *Attorney, Agent, or Firm*—David G. Conlin; David A. Tucker; Edwards Angell Palmer & Dodge LLP

(57) ABSTRACT

An optical transmission device including: a connector housing having an insert hole through which an optical plug for transmitting an optical signal is inserted and detachably supporting the optical plug; an optical element including at least either a light emitting element or a light receiving element and being arranged in proximity to a tip of the optical plug supported in the housing to send and receive the optical signal to and from the optical plug; and a driving circuit section for driving the optical element, wherein the driving circuit section is arranged in a closer position to the insert hole than the optical element along the optical plug.

4 Claims, 5 Drawing Sheets

OPTICAL TRANSMISSION DEVICE

CROSS-REFERENCE TO RELATED APPLICATION

This application is related to Japanese Patent Application No. 2001-212397 filed on Jul. 12, 2001, whose priority is claimed under 35 USC § 119, the disclosure of which is incorporated by reference in its entirety.

BACKGROUND OF THE INVENTION

1. Field of the Invention

The present invention relates to an optical transmission device. More particularly, it relates to a plugjack type optical/electric transmission device for transmitting and receiving optical and electric signals.

2. Description of Related Art

As shown in FIG. 8, Japanese Unexamined Patent Publication No. 2000-347074 discloses a photoelectric conversion module utilized in an optical/electric transmission device.

Referring to FIG. 8, a photoelectric conversion module 100 includes a casing 101, a light receiving element 103, a light emitting element 104, an electric circuit board 107 on which an electric driving circuit for transmission and an electric circuit for reception are mounted, and connector pins 108 for electrically connecting the electric circuits mounted on the electric circuit board 107 with external electric circuits.

Further, the photoelectric conversion module 100 includes a ferrule holder 105 having a receiving ferrule holder 105b and a transmitting ferrule holder 105c which are integrally formed. The receiving ferrule holder 105b functions to hold a transmitting ferrule holder of an optical plug inserted through optical plug jacks 101b and 101c in a predetermined position for optical connection with a light emitting element assembly. The transmitting ferrule holder 105c functions to hold a receiving ferrule holder of the optical plug inserted through the optical plug jacks 101b and 101c in a predetermined position for optical connection with a light receiving element assembly.

FIG. 9 is a plan view illustrating a conventional optical/electric transmission device module manufactured under the standards of ATM and IEEE 1394.b and FIG. 10 is a front view of the same.

Referring to FIGS. 9 and 10, a module 200 includes a holder 202 for detachably holding an optical plug 201. In the holder 202, a transmitting connector and a receiving connector are formed integrally and a light emitting element 203 and a light receiving element 204 are mold-packaged.

The holder 202 is placed on a circuit board 207 on which an integral circuit section 205 for driving the light emitting element and an amplifying integral circuit section 206 for the light receiving element are mounted. Further, the holder 202 has connection terminals 208 for electrically connecting the electric circuits mounted on the circuit board 207 with external electric circuits.

Japanese Unexamined Patent Publication No. Hei 11 (1999)-345987 describes a method of mounting a transmitting/receiving module for optical linkage which is comprised of an opening through which an optical fiber is inserted, a light receiving element and a light emitting element which carry the inserted optical fiber and first, second and third substrates connected to the elements.

According to the above-described conventional photoelectric conversion modules 100 (FIG. 8) and 200 (FIG. 9), the driving circuits are arranged at the back of the light receiving element and the light emitting element.

Therefore, the amount of wasted space grows above the circuit board 107 in the module 100 or above the integral circuit sections 205 and 206 in the module 200. As a result, the housing or the circuit section substantially occupies quite a large space in the device.

On the other hand, if the electric driving circuit for the light emitting element and the electric circuit for the light receiving element are formed integrally, electromagnetic coupling noise tends to be caused from the light emitting element and the driving circuit thereof to the light receiving element and the electric circuit thereof and vice versa.

According to the transmitting/receiving module for optical linkage disclosed in Japanese Unexamined Patent Publication No. Hei 11 (1999)-345987, a substrate connection terminal extends backward from the rear side of the light receiving element and the light emitting element, i.e., in a direction opposite to the opening with reference to the light receiving element and the light emitting element. Further, a transmitting/receiving electric circuit board is arranged further backward via the substrate connection terminal. Therefore, the module has quite a large length along the insert direction of the optical fiber.

SUMMARY OF THE INVENTION

In view of the above-described problems, the present invention has been achieved to provide a downsized optical transmission device.

According to the present invention, provided is an optical transmission device comprising: a connector housing having an insert hole through which an optical plug for transmitting an optical signal is inserted and detachably supporting the optical plug; an optical element including at least either a light emitting element or a light receiving element and being arranged in proximity to a tip of the optical plug supported in the housing to send and receive the optical signal to and from the optical plug; and a driving circuit section for driving the optical element, wherein the driving circuit section is arranged in a closer position to the insert hole than the optical element along the optical plug.

That is, since the driving circuit section is arranged in a closer position to the insert hole than the optical element, the length of the connector housing is reduced. Further, since the driving circuit section is arranged along the optical plug, i.e., the driving circuit section is arranged in proximity to and in parallel with the optical plug supported in the housing, the width of the housing is reduced.

Since the length and the width are thus reduced, the size of the optical transmission device is reduced.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
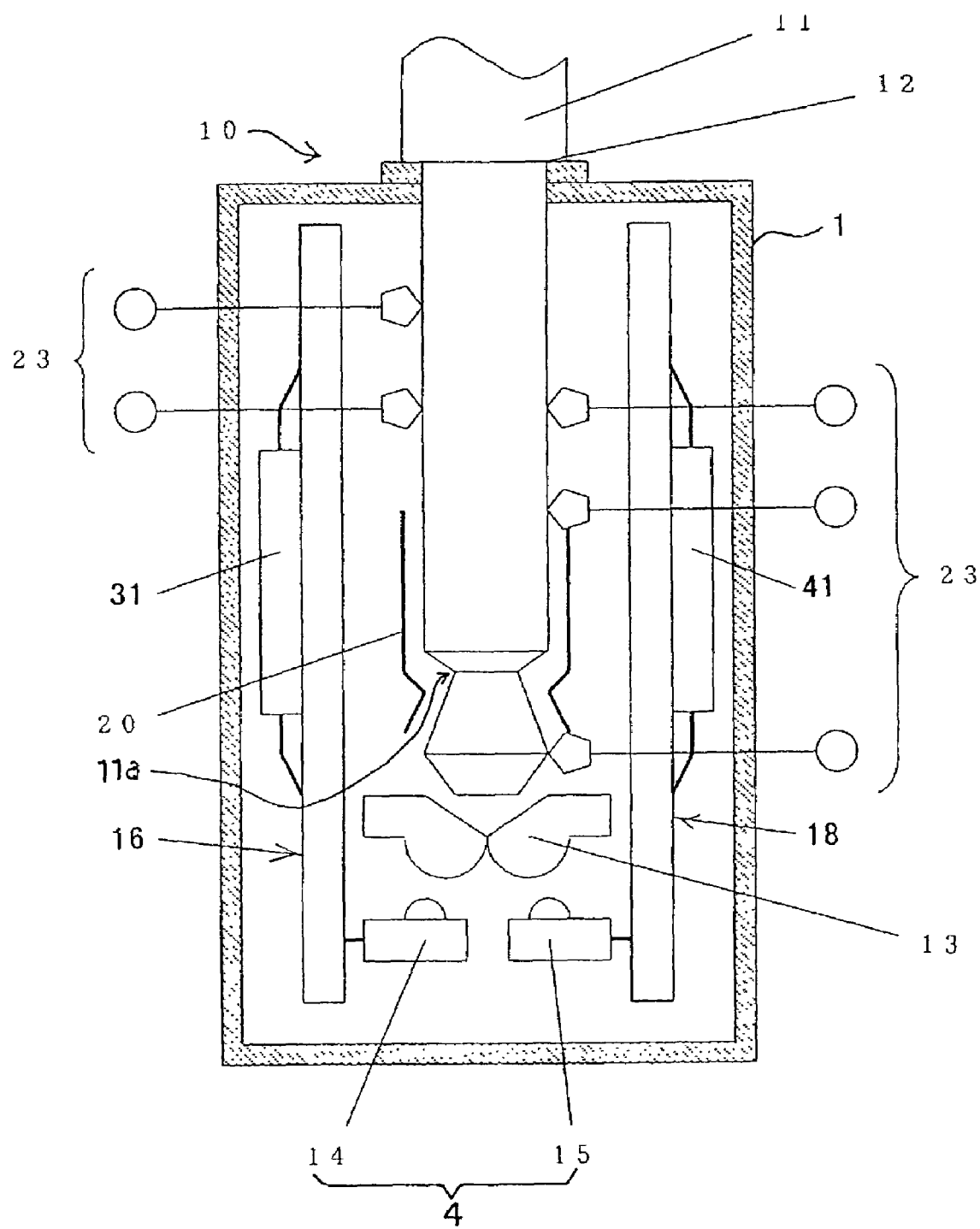
FIG. 1 is a front view illustrating an optical/electric transmission device according to Embodiment 1 of the present invention.

The optical transmission device according to the present invention can be utilized in electronic equipment such as digital television sets, digital BS tuners, CS tuners, DVD players, Super Audio CD (SACD) players, personal computers, peripheral equipment of the personal computers, cellular phones and PDAs.

The optical element according to the present invention may include either a light emitting element or a light receiving element or both of them.

If the light emitting element only is provided in the housing as the optical element, it is connected to a driving circuit board for the light emitting element which functions as a driving circuit section to constitute a unidirectional optical transmission device exclusive for transmission. If the light receiving element only is provided in the housing, it is connected to a signal processing circuit board for the light receiving element which functions as a driving circuit section to constitute a unidirectional optical transmission device exclusive for reception. Further, if both of the light emitting element and the light receiving element are provided in the housing, they are connected to the corresponding circuit boards, respectively, to constitute a bidirectional optical transmission device capable of transmission and reception.

Examples of the optical plug for signal transmission according to the present invention include an optical plug for receiving an optical signal generated by the light emission of the light emitting element, an optical plug for transmitting the optical signal to the light receiving element, and an optical plug for bidirectionally transmitting and receiving the optical signal. Each of these optical plugs is connected with an optical fiber cable at a proximal end thereof.

According to the present invention, in either case where the driving circuit section includes one or both of the above-mentioned circuit boards, the driving circuit section is arranged in parallel with the optical plug to reduce a projected area thereof with respect to the housing. Therefore, wasted space in the housing is minimized, which reduces the width of the housing.

If the driving circuit section is constituted of both of the signal processing circuit board for the light receiving element and the driving circuit board for the light emitting element, electromagnetic coupling noise is less caused between a set of the light emitting element and the driving circuit board and a set of the light receiving element and the signal processing circuit board. Therefore, favorable optical signal transmission can be realized without decreasing sensitivity of transmission and reception and setting up a complicated structure.

The signal processing circuit board for the light receiving element and the driving circuit board for the light emitting element are arranged to be opposed to each other on both sides of the optical plug supported in the housing to have the optical plug in the middle of them. Therefore, the projected area of the circuit boards in the housing is minimized and the width of the housing is reduced.

Since a large distance is provided between the circuit boards, the circuit boards are electromagnetically isolated. Further, space in the housing is effectively used to accommodate fewest possible components for the optical signal transmission without setting up a complicated structure by inserting a shield plate or the like. Therefore, the device is downsized and a high S/N ratio is obtained.

The signal processing circuit board for the light receiving element and the driving circuit board for the light emitting element have a grounding layer on a rear surface, respectively, and the grounding layers are opposed to each other to have the optical plug in the middle of them. Therefore, the electromagnetic isolation between the circuit boards is further enhanced, which allows the device to be downsized and have a high S/N ratio without setting up a complicated structure.

The optical plug includes a conductive part and a grounding terminal for grounding the conductive part when the optical plug is inserted in the housing. Therefore, the driving circuit section and the optical element are electromagnetically isolated, which allows the device to be downsized and have a high S/N ratio without setting up a complicated structure by inserting a shield plate or the like.

According to the present invention, the optical transmission device further includes an electric connection terminal to be connected with an electric plug for transmitting an electric signal which is inserted in place of the optical plug.

The electric connection terminal sends and receives the electric signal through an electric signal transmission cable connected to a proximal end of the electric plug for transmitting the electric signal or that of an optical/electric plug for transmitting the optical and electric signals.

Since the above-described electric connection terminal is provided, the optical and electric signal transmission is carried out by using a single housing without wasting the space in the housing. This eliminates the need of another housing exclusive for the electric plug and allows the downsizing of the device.

If the optical transmission device includes one or more electric connection terminal described above and at least one electric connection terminal includes a grounding terminal for both of the optical plug and the electric plug, the above-described grounding terminal exclusive for the optical plug is not necessary. This simplifies the structure in the housing and the space in the housing is effectively used.

The optical transmission device further includes a light diverging/converging element between the tip of the inserted optical plug and the optical element. Therefore, the transmission and reception are carried out at high efficiency and the device is downsized.

EMBODIMENTS

Hereinafter, the present invention is described by way of Embodiments with reference to the figures. However, the invention is not limited thereto.

Embodiment 1

FIG. 1 is a plan view illustrating the inside of an optical transmission device according to the present invention.

Referring to FIG. 1, an optical/electric bidirectional transmission device 10 includes a connector housing 1 having an insert hole 12 through which a plug 11 is inserted and a holding part 20 for fitting with and holding the plug 11 inserted through the insert hole 12, and the other components for optical transmission arranged in the housing 1 such as an optical element 4.

The plug 11 may be an optical plug for transmitting an optical signal, an electric plug for transmitting an electric signal or an optical/electrical plug for transmitting both of the optical signal and the electric signal. A proximal end of the plug is connected with an optical fiber cable or an electric signal transmission cable.

The holding part 20 is made of an elastic plate which is partially L-shaped and arranged in a circle and presses the neighborhood of a neck 11a of the plug 11 inserted through the insert hole 12 to prevent the plug 11 from moving along the axial direction and the direction orthogonal to the plug axis.

A tip of the plug 11 held in the holding part 20 is opposed to an optical element 4 including a light emitting element 14 and a light receiving element 15 through the intervention of a Prism lens 13 (a light diverging/converging element).

Both of the light emitting element 14 and the light receiving element 15 are mold-packaged elements and a light emitting surface and a light receiving surface thereof are faced to the Prism lens 13.

The light emitting element 14 is connected to a driving circuit board 16 for the light emitting element and the light receiving element 15 is connected to a signal processing circuit board 18 for the light receiving element.

In proximity to the holding part 20, a plurality of connection terminals 23 are arranged to contact the inserted plug 11. For example, the connection terminals 23 may be input terminals, output terminals and grounding terminals for the electric signal.

Figure 2:
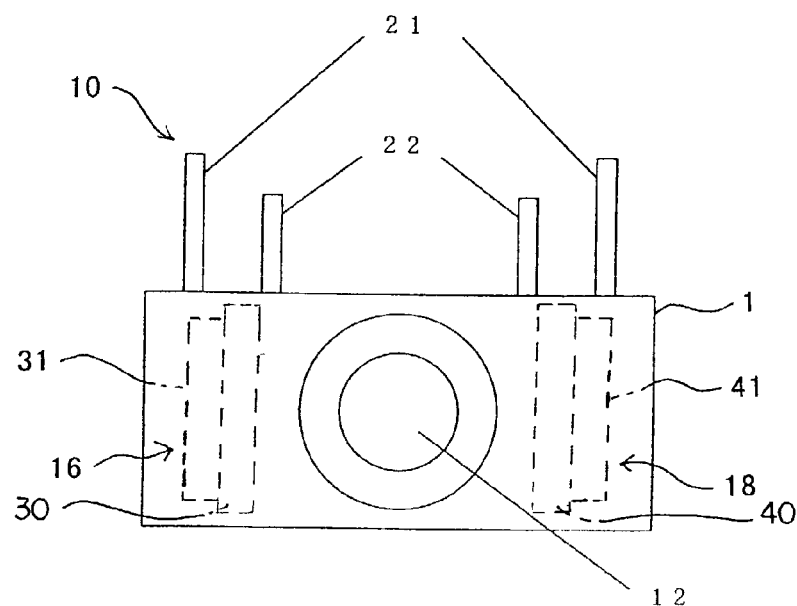
FIG. 2 is a side view illustrating the optical/electric transmission device of FIG. 1 observed from the direction of a plug insert hole.

FIG. 2 is a side view illustrating the optical/electric transmission device 10 observed from the direction of the insert hole 12.

Referring to FIG. 2, components indicated by reference numeral 21 are input/output terminals, power source terminals and grounding terminals of the driving circuit board 16 and the signal processing circuit board 18. Components indicated by reference numeral 22 are electric signal input terminals, electric signal output terminals and grounding terminals for the electric plug.

The driving circuit board 16 and the signal processing circuit board 18 are arranged between the optical element 4 and the insert hole 12 to drive the light emitting element 14 and the light receiving element 15, respectively.

The driving circuit board 16 and the signal processing circuit board 18 include rectangular substrates 30 and 40 and driving circuits 31 and 41 mounted on the substrates as mentioned later, respectively. The circuit boards 16 and 18 are flat and have heights in the direction of the width of the housing 1 (a transverse direction in FIGS. 1 and 2).

The circuit boards 16 and 18 are arranged in parallel with each other to have the plug 11 inserted in the housing 1 through the insert hole 12 in the middle of them. The circuit boards 16 and 18 are supported in the housing 1 so that their rear surfaces are opposed to each other at the smallest distance therebetween without contacting the plug 11.

Specifically, the circuit boards 16 and 18 are arranged in parallel with the holding part 20 such that the longer sides of the substrates 30 and 40 are substantially parallel to the axis of the plug 11 and the shorter sides are parallel to the height direction of the housing 1.

The Prism lens 13 and the optical element 4 are arranged closer to the insert hole 12 than the backward shorter sides of the substrates 30 and 40 (lower ends of the circuit boards 30 and 40 shown in FIG. 1).

Since the circuit boards 16 and 18 are arranged closer to the insert hole 12 than the optical element 4, the length of the connector housing 1 is reduced. Further, the circuit boards 16 and 18 are arranged on both sides of the optical plug 11 supported in the housing 1 to have the optical plug 11 in the middle of them such that their rear surfaces are opposed to each other. Therefore, the projected area of the circuit boards 16 and 18 in the housing 1 is minimized and thus the width of the housing 1 is reduced. Thus, the size reduction of the housing 1 is realized.

Figure 3:
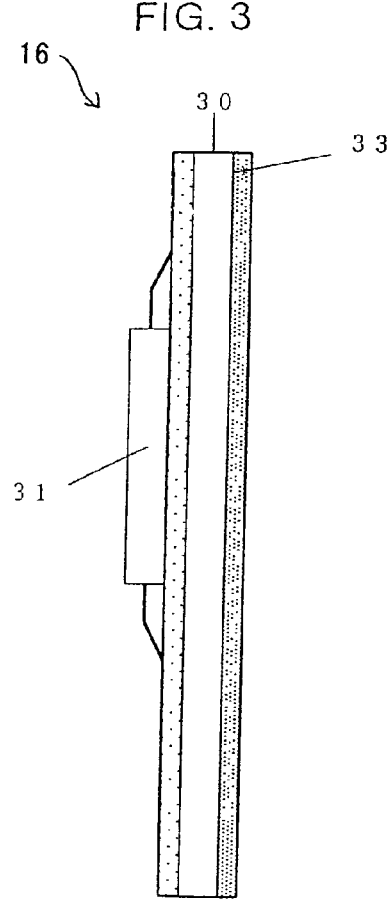
FIG. 3 is a front view illustrating a driving circuit board for a light emitting element of FIG. 1.

FIG. 3 is a sectional view illustrating the driving circuit board 16 of FIG. 1. In the driving circuit board 16, an integral circuit 31 for driving the light emitting element is mounted on a surface of the substrate 30 and a grounding layer 33 is formed on a rear surface.

Figure 4:
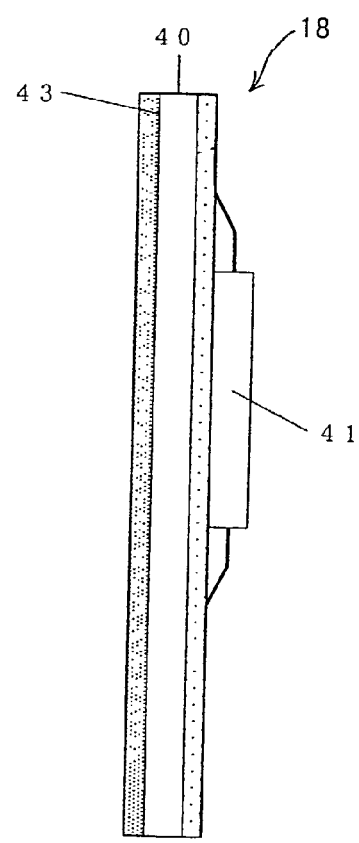
FIG. 4 is a front view illustrating a signal processing circuit board for a light receiving element of FIG. 1.

FIG. 4 is a sectional view illustrating the signal processing circuit board 18 of FIG. 1. In the signal processing circuit board 18, an amplifying integral circuit 41 for the light receiving element is mounted on a surface of the substrate 40 and a grounding layer 43 is formed on a rear surface.

Since the grounding layers 33 and 43 are formed, electromagnetic isolation of the circuit boards 16 and 18 is enhanced and a high S/N ratio can be obtained. In the present invention, however, the circuit boards 16 and 18 are separated, so that the electromagnetic isolation is realized even if the grounding layers 33 and 34 are not formed.

According to this Embodiment, the circuit boards 16 and 18 are arranged on both sides of the optical plug 11 such that their rear surfaces are opposed to each other. However, it may be possible to arrange the circuit boards 16 and 18 such that the front surfaces thereof are opposed to each other, or the front surface of the circuit board 16 or 18 is opposed to the rear surface of the circuit board 18 or 16.

Embodiment 2

Figure 5:
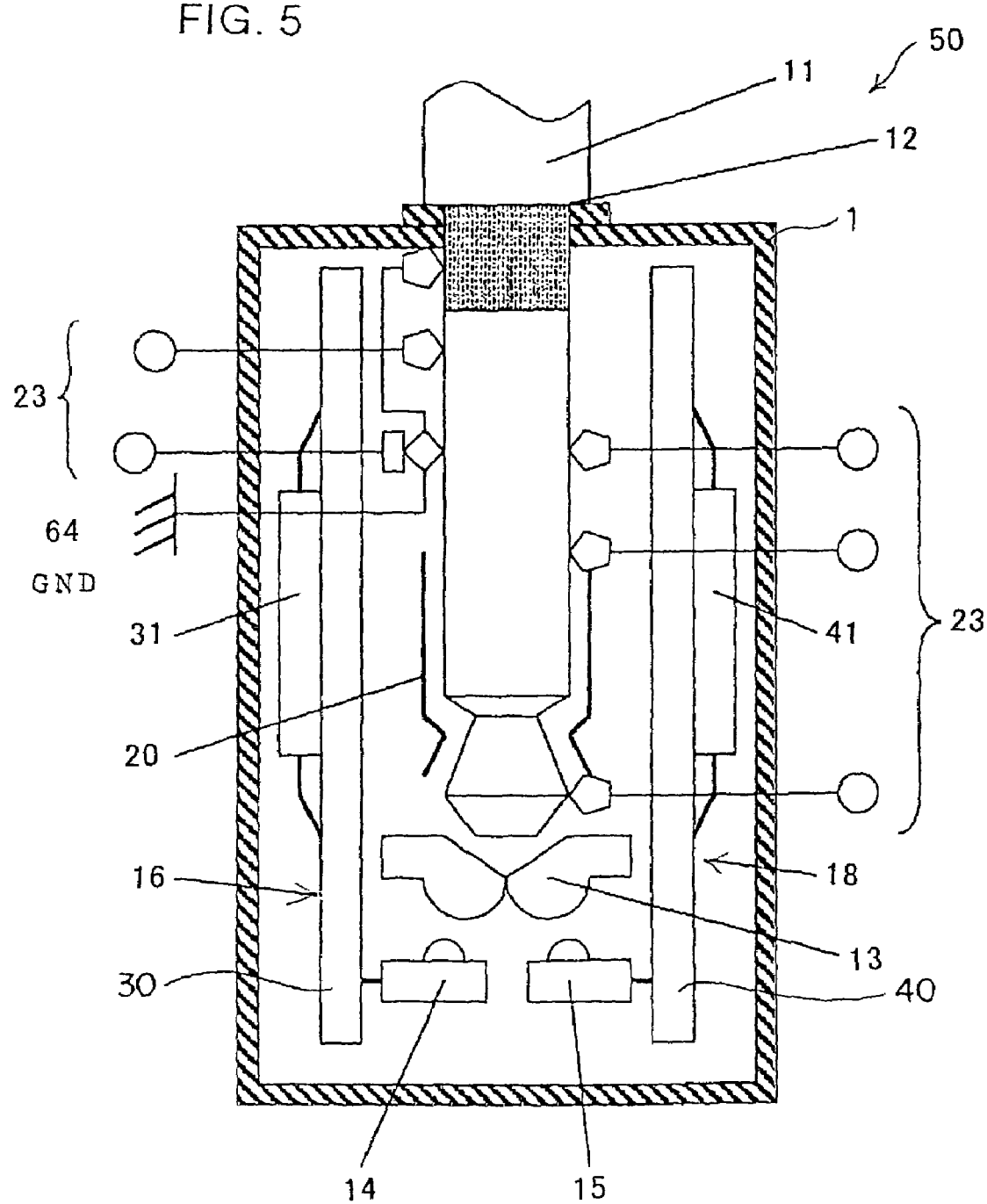
FIG. 5 is a schematic front view illustrating an optical/electric transmission device according to Embodiment 2 of the present invention.

FIG. 5 shows the inside of an optical/electric transmission device 50 according to Embodiment 2 of the present invention.

The optical/electric transmission device 50 is different from the optical/electric transmission device 10 according to Embodiment 1 in that it includes a grounding terminal 64 for an electric signal which is connected to a conductive part of the inserted optical plug. Therefore, explanation of components same as those of the optical/electric transmission device 10 is omitted.

Figure 6:
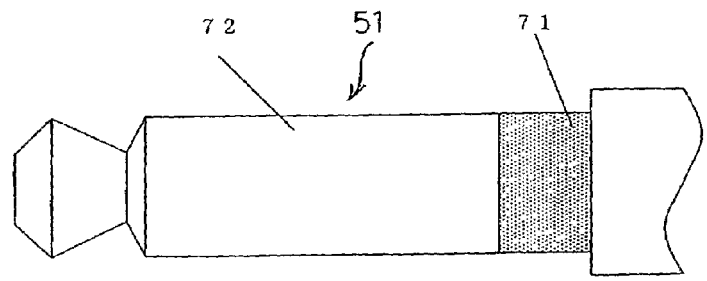
FIG. 6 is a front view illustrating an optical plug used for the optical/electric transmission device according to the present invention.
Figure 7:
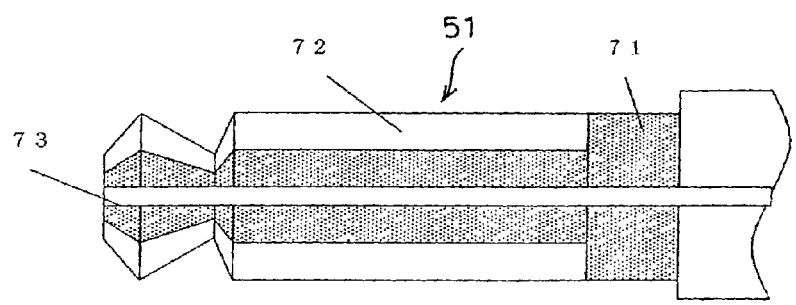
FIG. 7 is a front sectional view illustrating the optical plug of FIG. 6.
Figure 8:
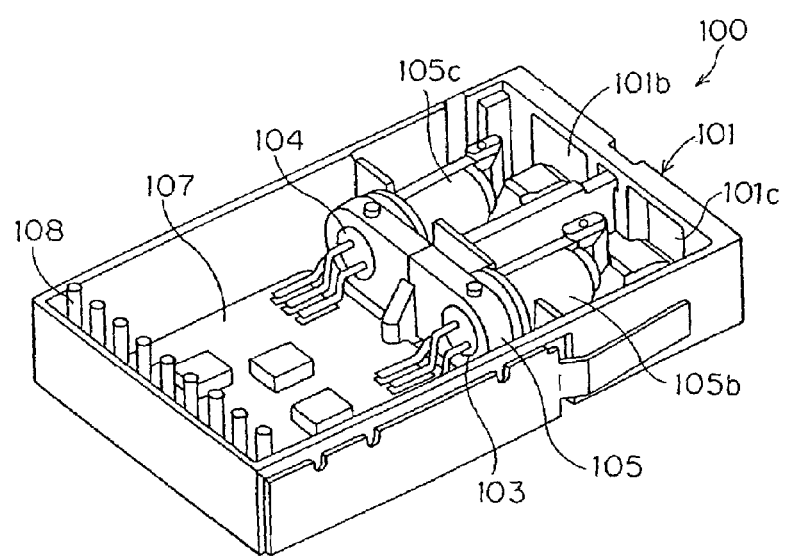
FIG. 8 is a perspective view illustrating an example of an optical transmission device according to the prior art.
Figure 9:
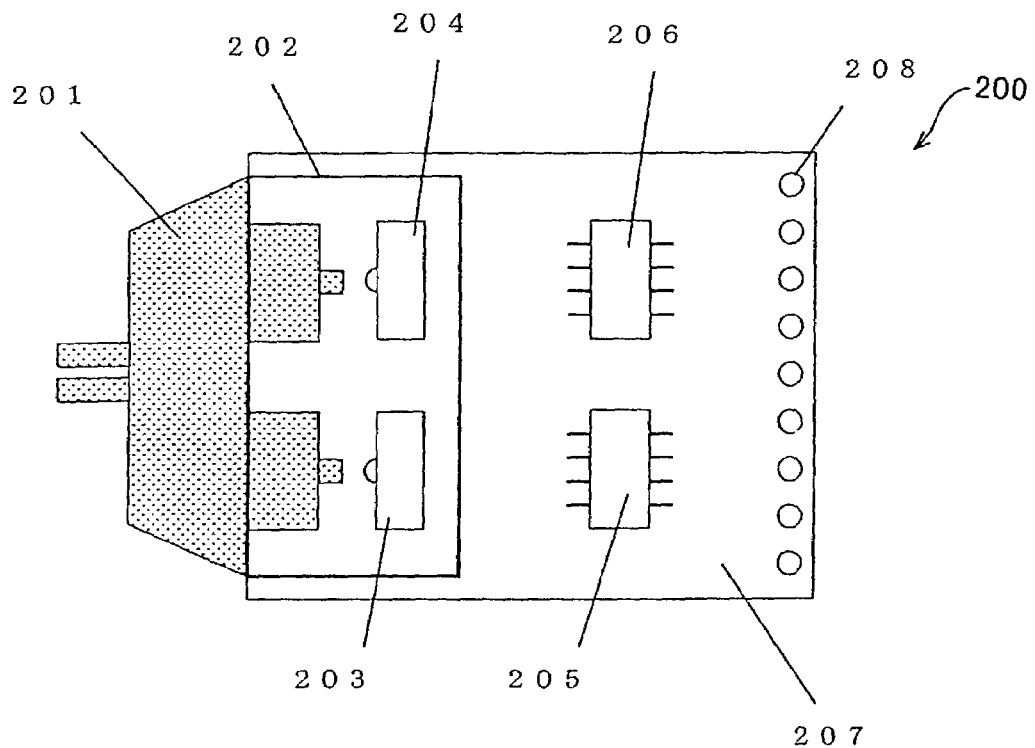
FIG. 9 is a front view illustrating an example of an optical transmission device according to the prior art.
Figure 10:
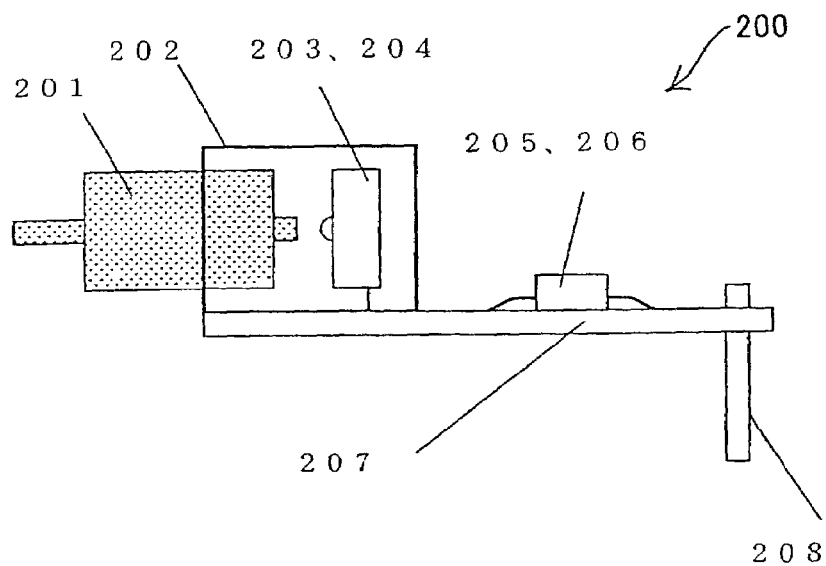
FIG. 10 is a side view of the optical transmission device of FIG. 9.

FIGS. 6 and 7 show an example of an optical plug which is inserted in the optical/electric transmission device 50 to send and receive optical and electric signals. FIG. 6 and FIG. 7 show an outward appearance and a sectional view of the optical plug, respectively.

An optical plug 51 includes a conductive part 71 made of metal or conductive resin and an insulative part 72 made of synthesized resin around its outer surface. The conductive part 71 is formed in a certain position of the plug (a part of the proximal end in FIGS. 6 and 7) such that a malfunction does not occur when the optical plug 51 is inserted in the optical/electric transmission device 50 and connected to electric signal transmission terminals 23. The insulative part 72 occupies the other part of the outer surface of the optical plug than the conductive part 71. An optical fiber 73 which is connected to an optical fiber cable is provided through the center of the optical plug 51.

When the optical plug 51 is inserted in the optical/electric transmission device 50, a grounding terminal 64 for an electric signal and the conductive part 71 of the optical plug 51 come into contact. Then, the conductive part 71 becomes at the same potential as the grounding terminal, thereby electromagnetic isolation is established.

Accordingly, electromagnetic coupling noise is less caused from the driving circuit board 16 to the signal processing circuit board 18 and vice versa, so that the optical signal transmission through the optical/electric transmission device can easily be carried out without decreasing the sensitivity of transmission and reception.

Since the grounding terminal 64 for the electric signal is connected to the conductive part 71 to ground it, the circuit boards 16 and 18 are isolated electromagnetically. Therefore, the device is downsized and a high S/N ratio is obtained without setting up a complicated structure by inserting a shield plate or the like.

According to Embodiments 1 and 2, the device includes a light emitting element assembly including the light emitting element 14 and the driving circuit board 16 and a light receiving element assembly including the light receiving element 15 and the signal processing circuit board 18 to transmit and receive the optical signal unidirectionally or bidirectionally with respect to the optical plug 11 or 51. However, the device may include either the light emitting element assembly or the light receiving element assembly such that the device functions as a device exclusive for transmitting or receiving the optical signal unidirectionally with respect to the optical plug 11 or 51.

According to Embodiments 1 and 2, the light emitting element 14 and the light receiving element 15 are driven by the circuit boards 16 and 18 arranged on both sides of the optical plug 11 or 51, respectively. However, the circuit boards 16 and 18 may be replaced with a single circuit board to be arranged on one side of the optical plug 11 or 51. In this case, the single circuit board is arranged along the optical plug 11 or 51 without contacting the optical plug 11 or 51 such that the projected area thereof with respect to the housing 1 is reduced. Thereby, the width of the housing 1 can be reduced.

As described in Embodiments 1 and 2, the driving circuit section is separated into the driving circuit board 16 and the signal processing circuit board 18. Therefore, the electromagnetic coupling noise is less caused between a set of the light emitting element 14 and the driving circuit board 16 and a set of the light receiving element 15 and the signal processing circuit board 18. Thus, favorable optical signal transmission can be realized without decreasing the sensitivity of transmission and reception and setting up a complicated structure.

The driving circuit board 16 and the signal processing circuit board 18 are arranged on both sides of the optical plug 11 or 51 supported by the holding part 20 to have the optical plug 11 or 51 in the middle of them. Accordingly, a large distance is provided between the circuit boards 16 and 18 and the electromagnetic isolation of the circuit boards 16 and 18 is realized without enlarging the device and wasting the space in the housing 1. Therefore, the device is downsized and a high S/N ratio is obtained without setting up a complicated structure by inserting a shield plate or the like.

Further, since the circuit boards 16 and 18 have grounding layers 33 and 43 on their rear surfaces, respectively, and the grounding layers 33 and 43 are opposed to each other, the electromagnetic isolation of the circuit boards 16 and 18 is further enhanced. Therefore, the device is downsized and a high S/N ratio is obtained without setting up a complicated structure.

Since the device includes one or more electric connection terminal 23 to be connected with an electric plug for transmitting an electric signal inserted in the housing 1, transmission of the optical and electric signals can be carried out by using a single housing without preparing another housing exclusive for the electric plug and wasting the space in the housing 1. Thus, the size of the device is reduced.

Between the tip of the inserted optical plug 11 or 51 and the optical element 4 including the light emitting element 14 and the light receiving element 15, the light diverging/converging element is provided. Therefore, the optical signal can be transmitted and received to and from an optical plug having an optical path which is not diverged.

The above-described Embodiments disclose the optical/electric bidirectional transmission devices 10 and 50 each having the light emitting element 14 and the light receiving element 15. However, an optical/electric transmission device in which one of the light emitting element 14 and the light receiving element 15, or plural pairs of the light emitting elements 14 and the light receiving elements 15 are accommodated in the housing 1 also falls within the scope of the present invention.

Further, in the above-described Embodiments, the Prism lens 13 and the optical element 4 are arranged closer to the insert hole 12 than the backward shorter sides the substrates 30 and 40 (lower ends of the circuit boards 16 and 18 shown in FIG. 1). However, the Prism lens 13 and the optical element 4 may be arranged farther from the insert hole 12 than the backward shorter sides of the substrates 30 and 40.

According to the present invention, the driving circuit section is arranged closer to the insert hole than the optical element, thereby the length of the connector housing is reduced. Further, since the driving circuit section is arranged in proximity to and in parallel with the optical plug supported in the housing, the width of the housing is reduced. Therefore, the size of the optical transmission device is reduced.

Moreover, the electromagnetic coupling noise is less caused between a set of the light emitting element and the driving circuit board and a set of the light receiving element and the signal processing circuit board. Therefore, favorable optical signal transmission is realized without decreasing the sensitivity of transmission and reception and setting up a complicated structure.

What is claimed is:

1. An optical transmission device comprising:
   a connector housing having an insert hole through which an optical plug for transmitting an optical signal is inserted and detachably supporting the optical plug;
   an optical element including at least either a light emitting element or a light receiving element and being arranged in proximity to a tip of the optical plug supported in the housing to send and receive the optical signal to and from the optical plug; and
   a driving circuit section for driving the optical element, wherein the driving circuit section is arranged in a closer position to the insert hole than the optical element along the optical plug;

wherein the optical element includes a light emitting element and a light receiving element and the driving circuit section includes a signal processing circuit board for the light receiving element and a driving circuit board for the light emitting element, and wherein the signal processing circuit board for the light receiving element and the driving circuit board for the light emitting element have a grounding layer on a rear surface, respectively, and the grounding layers are opposed to each other to have an optical plug in the middle of them.

2. An optical transmission device comprising:

a connector housing having an insert hole through which an optical plug for transmitting an optical signal is inserted and detachably supporting the optical plug;

an optical element including at least either a light emitting element or a light receiving element and being arranged in proximity to a tip of the optical plug supported in the housing to send and receive the optical signal to and from the optical plug; and a driving circuit section for driving the optical element, wherein the driving circuit section is arranged in a closer position to the insert hole than the optical element along the optical plug; and wherein the optical plug includes a conductive part and a grounding terminal for grounding the conductive part when the optical plug is inserted in the housing.

3. An optical transmission device comprising:

a connector housing having an insert hole through which an optical plug for transmitting an optical signal is inserted and detachably supporting the optical plug;

an optical element including at least either a light emitting element or a light receiving element and being arranged in proximity to a tip of the optical plug supported in the housing to send and receive the optical signal to and from the optical plug; and a driving circuit section for driving the optical element, wherein the driving circuit section is arranged in a closer position to the insert hole than the optical element along the optical plug;

said optical transmission device further comprising: an electric connection terminal to be connected with an electric plug for transmitting an electric signal which is inserted in place of the optical plug.

4. An optical transmission device comprising:

a connector housing having an insert hole through which an optical plug for transmitting an optical signal is inserted and detachably supporting the optical plug;

an optical element including at least either a light emitting element or a light receiving element and being arranged in proximity to a tip of the optical plug supported in the housing to send and receive the optical signal to and from the optical plug; and a driving circuit section for driving the optical element, wherein the driving circuit section is arranged in a closer position to the insert hole than the optical element along the optical plug;

said optical transmission device further comprising: one or more electric connection terminal to be connected with an electric plug for transmitting an electric signal which is inserted in place of the optical plug, wherein at least one electric connection terminal includes a grounding terminal for both of the optical plug and the electric plug.

* * * * *